United States Patent [19]
Huston

[11] 3,887,841
[45] June 3, 1975

[54] HIGH SPEED CAMERA

[75] Inventor: Alexander Edward Huston, Reading, England

[73] Assignee: John Hadland Photographic Instrumentation Ltd., Herts, England

[22] Filed: June 14, 1973

[21] Appl. No.: 370,032

Related U.S. Application Data

[63] Continuation-in-part of Ser. No. 133,677, April 13, 1971, abandoned.

[30] Foreign Application Priority Data
Apr. 20, 1970 United Kingdom............... 18700/70

[52] U.S. Cl. .............................................. 315/391
[51] Int. Cl. ........................................... H01j 29/72
[58] Field of Search .................... 315/25, 26, 11, 10

[56] References Cited
UNITED STATES PATENTS
2,769,116  10/1956  Koda................................ 315/27 R OTHER PUBLICATIONS
Huston, "Image Tube High-Speed Camera," 1966, 957–968, Advances in Electronics & Electron Physics, Vol. 22B.

Primary Examiner—Malcolm F. Hubler
Assistant Examiner—J. M. Potenza
Attorney, Agent, or Firm—Wenderoth, Lind & Ponack

[57] ABSTRACT

An electron image tube camera for framing at speeds greater than $10^8$ frames per second. Two pairs of electrostatic deflector plates are fed with, respectively, a saw-tooth waveform of frequency greater than 100 MHz. and a linear ramp which cancels the deflection produced by portions of the saw-tooth waveform.

2 Claims, 7 Drawing Figures

HIGH SPEED CAMERA

This application is a continuation-in-part of my prior co-pending application Ser. No. 133677 filed Apr. 13, 1971 and now abandoned.

FIELD OF THE INVENTION

This invention relates to an electron image tube camera for producing a succession of stationary images across the screen of the image tube.

BACKGROUND TO THE INVENTION

In the development of high speed cameras for the investigation of fast moving phenomenon a demand for increased time resolution is usually met, in the first instance, by recourse to streak photography. The loss of one dimension of spatial information that this entails is not usually tolerated for long by users and a clamour for cameras giving full frame information at increased speeds soon follows. In the image convertor field, single frame cameras with exposure times of less than one nano second have been proposed, for example by Laviron and Delmare at the Proceedings of the ninth International Congress on high speed photography at Denver in 1970. However, often a sequence of frames is required and the use of batteries of single frame cameras suffers from the considerable disadvantages of bulk, expense and the difficulty of obtaining a common line of sight.

One recent development is the camera described by me in Advances in EEP, Volume 22B page 957 (1966). In that camera the image tube used has three pairs of detector plates in the drift space between anode and screen and repetitive shuttering is obtained by deflecting an electron beam repeatedly across an aperture in a metal plate situated centrally in the tube. Sinusoidal waveforms are used for this action and a combination of sinusoidal and staircase deflection waveforms, applied to the electrons, enables a pattern of discrete images to be positioned in two separate rows on the screen of the tube. The original system employed continuously generated sinusoids but in a later development described in Proceedings of Electro-optics 1971 International Conference, page 344, the electronic circuits which produce the sinusoidal and staircase waveforms are quiescent until the arrival of a trigger pulse. This feature enables the total power consumption of the camera to be reduced to 50 volt-amps. This in turn made possible the design of a self contained instrument without bulky external power supplies. A standard Imacon camera will operate in the framing mode at speeds from $5 \times 10^4$ to $2 \times 10^7$ frames per second, the exposure duration per frame being 1/5th of the time interval between frames. The highest speed at which this system has been made to operate is $6 \times 10^7$ frames per second but at speeds as high as this engineering problems become difficult.

Usually, image convertors achieve framing operation by first interrupting an electron beam in the tube to effect repetitive shuttering and then shifting the interrupted beam to different areas of the screen, thereby producing the customary pattern of separated images.

SUMMARY OF THE INVENTION

In the new camera that I have invented, the initial beam interruption is unnecessary. Beam deflection for mutiple framing is obtained using two pairs of deflector plates, deflecting in the same plane. To one pair of plates is applied a repetitive saw-tooth waveform while a linear ramp waveform is applied to the other pair. The rate of deflection produced by portions of the saw-tooth waveform is the same as the rate of deflection produced by linear ramp, but of opposite sense. The two waveforms when added give a staircase of which the plateaux are formed by the cancellation of the rise of one waveform by the fall of the other and are interspersed with portions producing very rapid deflection. Preferably a generator for the saw-tooth waveforms runs continuously but the linear ramp signals generator has a single stroke. The camera may be synchronised to the event it photographs by triggering of the linear ramp generator.

The frequency of oscillation of the saw-tooth generator is equivalent to the framing rate of the camera, so that it is normally necessary to generate a waveform which has a frequency exceeding 100 Megahertz and a peak-to-peak amplitude of some 400 volts since the deflection sensitivity of the image tube is normally comparatively low. I have found that a waveform of sufficient accuracy is formed by the production of a sinusoid to which a second harmonic component is added with the appropriate amplitude and phase. A waveform conforming to the formula $(\sin wt - 0.22 \sin 2wt)$ has been found to produce good results.

DESCRIPTION OF THE ACCOMPANYING DRAWINGS

Figure 1:
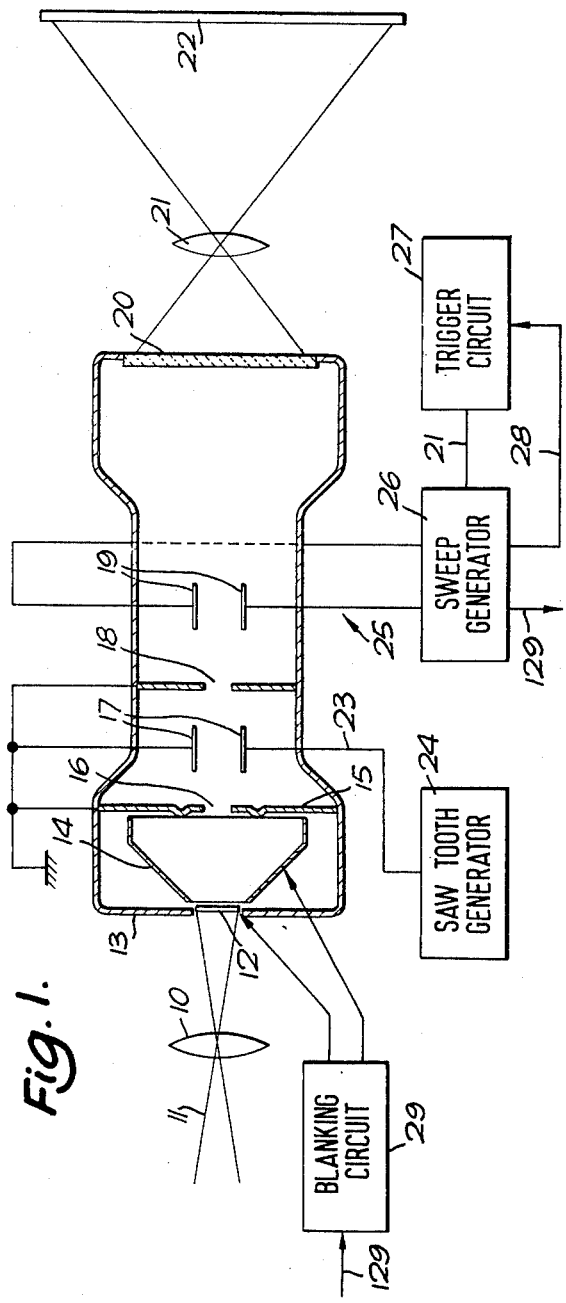
FIG. 1 is a schematic diagram of the image tube of a camera and associated apparatus.

The camera illustrated in the drawings is now commercially available under the name Imacon 600. It is principally intended to direct a number of images of an object successively onto a photographic film which records the images. The time interval between successive images is short, preferably short enough to allow framing at more than $10^8$ frames per second.

Referring to FIG. 1, the camera comprises a first convex lens 10 which focuses light wave from the object to be photographed onto a photo-emissive cathode 12. The cathode 12 is held within an image tube 13 which is mounted so that it longitudinal axis passes through the two focal points of the lens 10.

The image tube 13 including its internal focussing and deflector means is of the type commercially available under the reference P856 made by the English Electric Valve Company Limited, Chelmsford, Essex, England. The image tube itself is an electro-statically focused triode image convertor with electro-static deflectors making possible both pulse and sweep operations. Only the parts of the image tube relevant to the improvement provided by the present invention need be described.

Mounted within the image tube is an ordinary conical focussing electrode 14 which focuses the electron beam produced by the photo-emissive cathode towards an earthed anode 15 which is provided with a central aperture 16. Arranged on opposite sides of the axis of the image tube 13 are deflector plates 17 of which one is connected to earth and the other is connected to an input line 23.

Along the image tube 13 from the first deflector plates 17 is an aperture 18 which serves to prevent stray electrons from passing any further along the image tube 13. Beyond the aperture 18 is a second pair of deflector plates 19 which are parallel with the first deflector plates 17 and are also each arranged on opposite sides of the longitudinal axis of the image tube 13. The plates 19 are connected to input lines 25.

A fluorescent screen 20 forms the end of the image tube 13.

The invented camera includes a second convex lens 21 mounted with its focal points on the longitudinal axis of the image tube 13 so as to focus any image produced by an electron beam on the fluorescent screen 20 onto a photographic plate 22.

Figure 2:

The line 23 is fed by a saw-tooth waveform generator 24 which produces the output illustrated in FIG. 2 of the drawings. The saw-tooth waveforms $2a$ includes at least one portion $2b$ which increases from a zero value to a maximum value $2c$ at a constant rate. Although the decrease of the waveform from the maximum value $2c$ to the zero value $2d$ is shown as being a constant rate it may in practice decrease at a varying rate. A saw-tooth waveform of sufficient accuracy is generated by the production of a sinusoidal waveform from which a second harmonic component is generated, which is added to the fundamental in appropriate relative amplitude and phase. It is greatly preferred that the saw-tooth waveform is represented by the expression $\sin wt - 0.22 \sin 2wt$ were $w$ represents a frequency in excess of 100 MHz. It is preferred to operate at either 150 MHz or 300 MHz.

Figure 3:
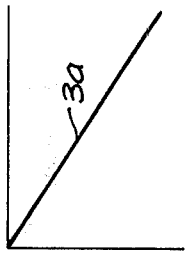

Coupled to the lines 25 is a sweep generator 26 which is triggered by an ordinary trigger circuit 27. The sweep generator 26 produces a ramp signal which increases linearly with time at the same rate as the linear portion of the saw-tooth waveform illustrated in FIG. 1. The output of the sweep generator is shown at $3a$ in FIG. 3 and is shown as negative because it is applied to the plates 19 with a polarity opposite to that of the saw-tooth waveform of FIG. 2 so that it cancels the deflections produced by the portions $2b$ of the saw-tooth waveform.

The sweep generator 26 is set into operation on receipt of a triggering signal from the trigger circuit 27. In accord with ordinary practice the sweep generator can produce a signal on a line 28, leading back to the trigger circuit, to block the trigger circuit during the time the forward sweep is being produced. The sweep generator can also produce on a line 129 an output which is fed to a blanking circuit 29 to block the flow of electrons after a sweep period, that is to say after a multiplicity of framing operations.

The camera described with reference to the foregoing Figures operates as follows: The generator 24 applies a continuous saw-tooth waveform to the plates 17. An object is brought into an appropriate position to be photographed by the camera. A triggering signal is then transmitted by the trigger circuit 27 to start the sweep generator 26 which is adjusted to produce a ramp signal whose rate of increase corresponds closely, though not necessarily exactly, to the rate of increase of the upward portions of the saw-tooth waveform produced by the generator 24. Simultaneously, light waves 11 from the object are focused onto the photo image cathode 12 by the first convex lens 10. The cathode produces a beam of electrons which are characteristic of the light 11 and this beam of electrons is accelerated as it moves towards the anode 15. The accelerated electrons pass through the aperture 16 and come into the field of influence of the deflector plates 17 to which are applied the saw-tooth waveform from the generator 24. Thus a saw-tooth deflection is imparted to the beam of electrons, which then pass through the aperture 18 which is wider than the amplitude of the deflection of the beam so that only stray electrons are prevented from passing further along the image tube 13.

Figure 4:
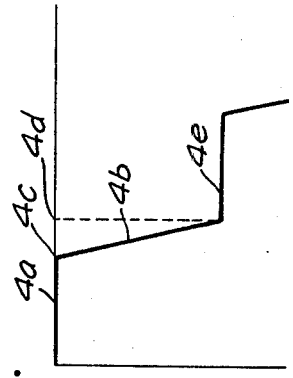
FIGS. 2 to 4 illustrate several waveforms generated in the apparatus of FIG. 1.

If the deflection of the beam is increasing at the same effective rate as the portion $2b$ of the saw-tooth waveform as the beam arrives at the second pair of deflector plates 19, which have the ramp waveform applied to them, then the deflection produced by the second pair of plates 19 will cancel the deflection produced by the first plates by the portion $2b$ of the saw-tooth waveform. Thus the beam of electrons will cause the fluorescent screen to fluoresce and the optical image so formed will be focussed onto the photographic plate 22 by the second convex lens 21 without any resultant deflection. This is shown in FIG. 4 by the line $4a$. The stationary image produced on the fluorescent screen will be recorded by the photographic plate. If the image is not stationary then a blurred effect will occur and suitable remedial action described below must be taken.

As the deflection of the electron beam produced by the saw-tooth waveform on the first plates 17 passes a maximum, denoted by a point $4c$ on the waveform, the deflections produced by the two pairs of plates 17 and 19 begin to co-act. Thus for a short period of time the deflection of the beam of electrons is very rapid and the image is shifted rapidly across the fluorescent screen 20 and the photographic plate 22. This is represented by the line $4b$ in FIG. 4. The time interval between the points $4c$ and $4d$ on FIG. 4 is determined by the rapidity of the decreasing portion $2d$ of the saw-tooth waveform. The frequency of the sinusoidal wave used to construct the saw-tooth waveform is so high that the rapidity of the deflection corresponding to the portion $4b$ is too fast to cause the screen 20 to fluoresce sufficiently for photographic recordal.

After the saw-tooth waveform passes through zero (point $2e$) then the net deflection $4e$ produced by the two pairs of plates 17 and 19 once again is zero. The stationary image on the fluorescent screen 20 is recorded on the photographic plate.

In a preliminary test run it may occur that upon inspection of the photographic plate the recorded images are blurred or smeared. This is due to lack of coincidence of the rate of rise of the portion $2a$ of the saw-tooth and the rate of change of the ramp waveform. In this case the rate of change of the linear ramp waveform is increased or decreased (as described hereinafter) as necessary to eliminate blurring. Subsequent photographic images may be necessary to obtain complete absence of blurring.

Figure 5:
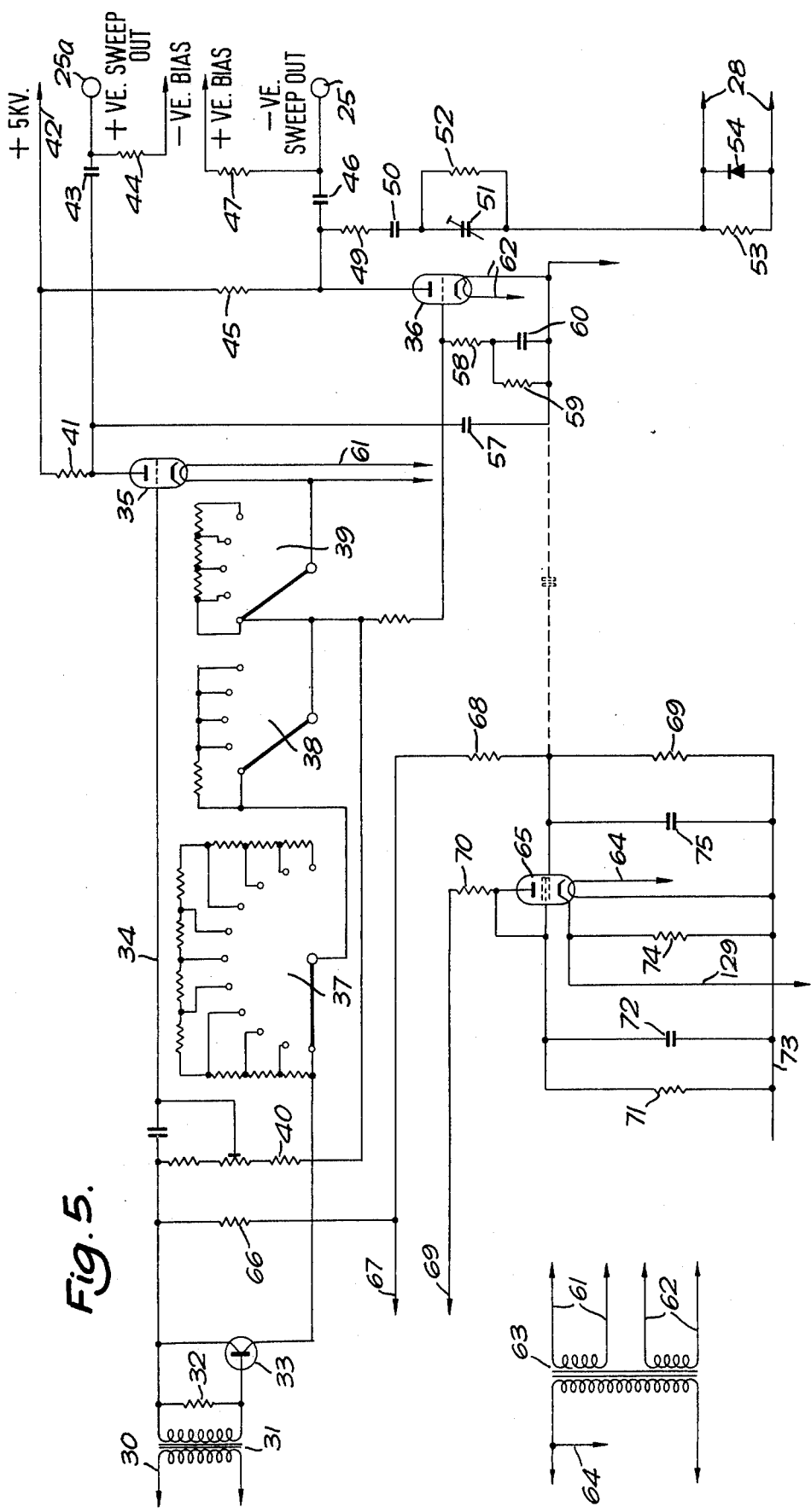
FIGS. 5, 6 and 7 are specific circuit diagrams of various parts of the electronic apparatus schematically illustrated in FIG. 1.

FIG. 5 illustrates a specific and preferred circuit for the sweep generator 26 of FIG. 1. The circuit includes an input 30 with an input transformer 31 coupling the input to a resistor 32 which is coupled between the base and emitter of a transistor 33. This transistor is coupled by a control network 34 to two planar triodes 35 and 36 which provide current drain for the capacitance constituted by the pair of deflector plates 19. The anodes of the two triodes are coupled to the output lines 25 and 25a. The network 34 is connected between the grid and cathode of the triode 35 and consists of a cascade of multiple position switches 37, 38 and 39 each of which is capable of inserting in series between the collector of the transistors 33 and the cathode of the valve 35 a selectable resistance. The switch positions would normally be calibrated in any suitable way known to those skilled in the art. The operation of one or more of the switches 37, 38 or 39 varies the current through the triodes 35 and 36 and thus effectively varies the slope of the sweep voltage produced.

The grids of the triodes 35 and 36 are connected by a chain of resistors 40 which at a point along the chain is connected to the switch 38. The anode of the triode 35 is connected through a resistor 41 to a positive 5 kilo-volt terminal 42 and is connected through a capacitor 43 to the output line 25a. The output line 25a is coupled through a resistor 44 to a negative bias. The 5 kilo-volt positive terminal 42 is connected through a resistor 45 to the anode of the triode 36 whose anode is connected through a capacitor 46 to the output line 25 which is connected through a resistor 47 to a positive bias. The anode of the triode 36 is coupled through a resistor 49, a capacitor 50, a parallel circuit of an adjustable capacitor 51 and resistor 52 to a parallel circuit of a resitor 53 and diode 54 which is coupled by means of the coupling 28 to any suitable location in the trigger circuit for inhibiting the trigger circuit during the production of a sweep. The anode of the triode 35 is connected through a capacitor 57 to the cathode of the triode 36 whose grid is connected to its cathode through a resistor 58 and resistor 59 in parallel with a capacitor 60.

The triodes 35 and 36 have respective cathode heater circuits 61 and 62 which are connected to secondary windings of a transformer 63. The primary of this transformer is connected to the heater circuit 64 of a gas filled valve 65. The control grid of this valve is connected to the junction of resistors 68 and 69, which are coupled in series between an earth line 73 and a resistor 66 connected to the emitter of the transistor 33. The junction of the resistor 66 and 68 is coupled to a negative 2½ kilo-volt terminal 67. A positive 2½ kilo-volt terminal 69 is connected through a resistor 70 to the anode of the gas filled valve 65. This anode is connected to the screen grid of the valve and also through a resistor 71 and a shunt capacitor 72 to the earth line 73. The cathode of the valve 65 is connected through a resistor 74 to the earth line and through the line 29 to a circuit 109 (FIG. 1) which develops a blanking pulse for application between the cathode 12 and focus electrode 14.

It will be readily appreciated by those skilled in the arts that consequent on an input signal received at the input 30 the current amplifier constituted by the transistor 33, the network 34 and the valves 35 and 36 function to provide a sweep waveform by draining the charge on the capacitance between the plates 19, which are recharged on the cessation of the sweep. The sweep waveforms is the linear ramp, shown in FIG. 3. Its slope can be altered by altering the switches 37 to 39.

Figure 6:
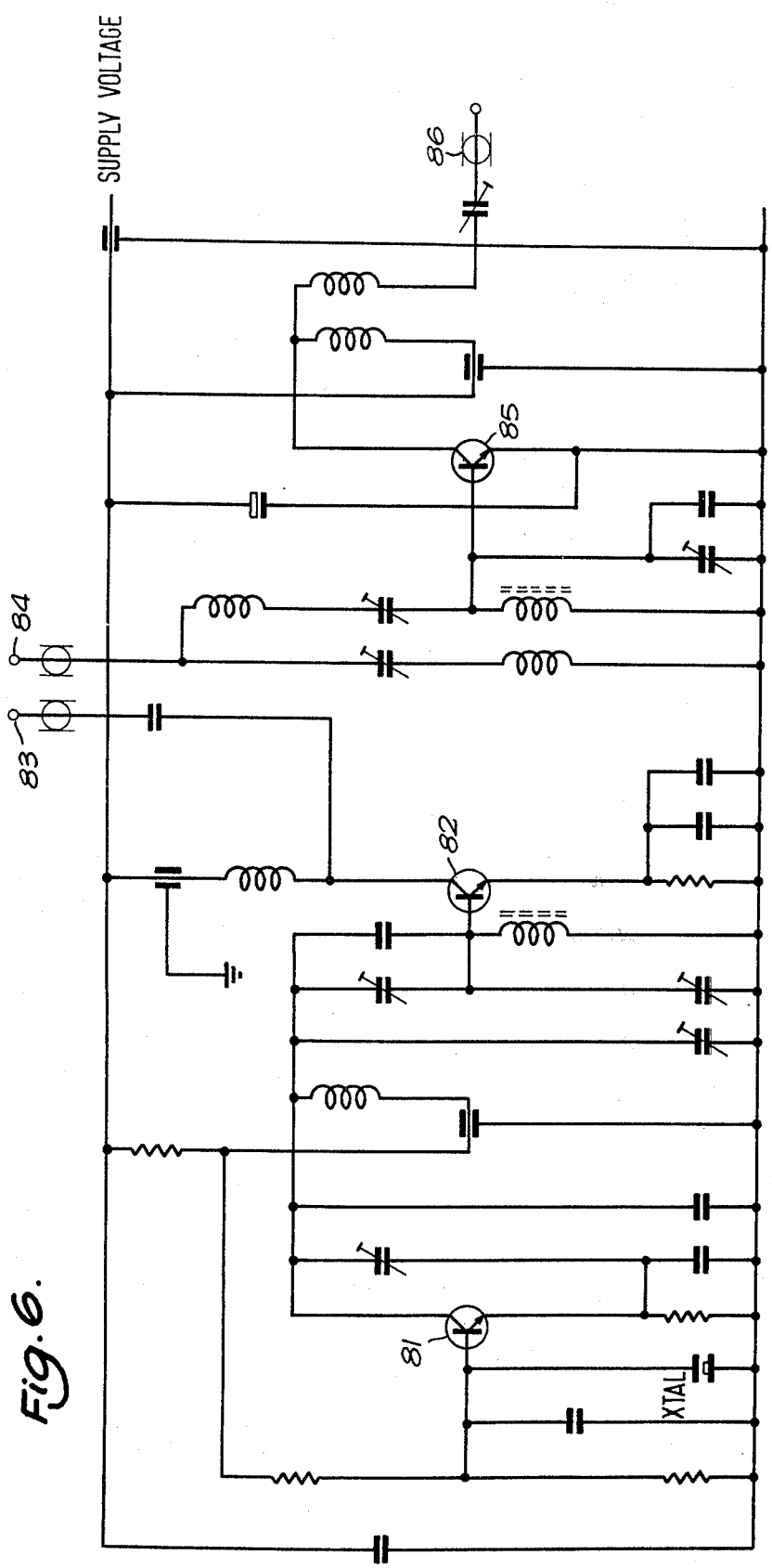
Figure 7:
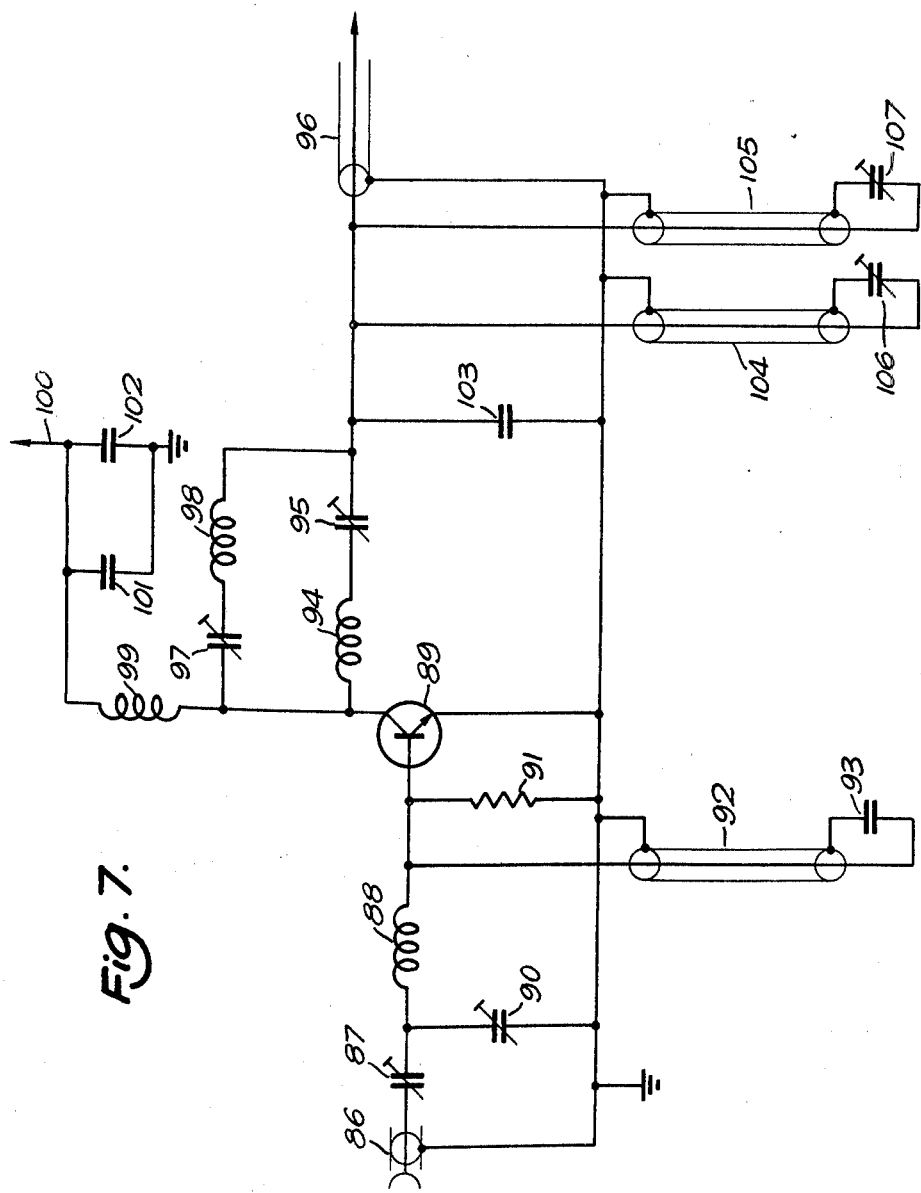

FIGS. 6 and 7 show a preferred circuit for the saw-tooth generator 24. FIG. 6 illustrates a circuit for the production of either a 150 MHz output or a 300 MHz output. FIG. 7 shows a saw-tooth synthesiser adapted for a 300 MHz fundamental; normally if a 150 MHz fundamental were required a circuit similar to the circuit of FIG. 7 would be used in place of the circuit actually shown. The circuit of FIG. 7 may be in modular or plug-in form.

The circuit shown in FIG. 6 comprises essentially a 150 MHz oscillator in which the active devices are the transistors 81 and 82. The construction of this circuit need not be described in detail for its operation will be readily apparent to those skilled in the art. The output of the oscillator is fed out on a line 83 and is used directly for operation at 150 MHz. In the present embodiment operation at 300 MHz is preferred. The line 83 is coupled to an input line 84 of a multipler circuit comprising the transistor 85 and its associated passive components. The multipler effects a doubling of the frequency and provides an output on a line 86 to the circuit shown in FIG. 7.

The circuit of FIG. 7 is arranged to augment the fundamental frequency of 300 MHz with its second harmonic in order to produce an output proportioned in accordance with the formula $\sin wt - 0.22 \sin 2wt$ as hereinbefore set forth.

The input line 86 is coupled through a capacitor 87 and an inductor 88 to a transistor 89. The emitter of this transistor is connected to earth. A variable capacitor 90 couples the junction of the capacitor 87 and the inductor 88 to earth and a resistor 91 is coupled between the base and the emitter of the transistor 89. Also between the base and emitter of the transistor 89 is coupled one end of a co-axial line which at the frequency of operation has a length corresponding to a quarter wave length. The line is terminated by a capacitor 93.

The collector of the transistor 89 is coupled through an inductor 94 and a variable capacitor 95 to the centre conductor of an output co-axial line 96. The casing of this line is connected to earth. In parallel with the series combination of inductor 94 and capacitor 95 is a series combination of a variable capacitor 97 and an inductor 98. The collector of the transistor is also coupled through an inductor 99 to a positive terminal 100, which is coupled by parallel capacitors 101 and 102 to earth.

The centre conductor of the line 96 and earth are connected through a capacitor 103. They are also connected by two quarter-wave lengths of co-axial line 104 and 105 each of which is terminated by a respective capacitor 106 and 107, these capacitors being adjustable.

It will be readily apparent that adjustment of the variable capacitors of the circuit of FIG. 7 makes possible the adjustment of amplitude and phase of the second harmonic (600 MHz) of the fundamental frequency of 300 MHz. In essence the circuit of FIG. 7 is an amplifier designed to give substantial harmonic content in its output, the variable capacitors enabling the harmonic content to be adjusted.

Whereas I have in the foregoing described a specific working embodiment of my invention, it will be readily apparent to those skilled in the art that considerable modification can be made within the scope and spirit of the claims that follow.

I claim:

1. In an electron image tube camera of the type wherein an electron beam is formed in accordance with an optical image and is directed at a screen for the production of an image which is reproduced photographically and wherein the image tube includes first and second deflector means for deflecting the beam transversely in the same plane in response to electrical signals, the improvement which comprises, in combination with the deflector means:

means for generating a linear ramp signal;
means for applying said ramp signal to the first deflector means so as to produce deflection of said beam across said screen;
means for generating a repetitive signal of frequency greater than 100 MHz. and having portions capable of producing deflection of said beam at the same rate as said ramp signal; and
means for applying said repetitive signal to the second deflector means so that said portions produce deflection of said beam in cancellation of deflection produced by said ramp signal, and the deflection of the beam across the screen produced by the said signals alternates between substantially zero and a rapid value.

2. The improvement as set forth in claim 1 wherein the repetitive signal generating means comprises:

means for generating a signal of frequency higher than 100 MHz;
means for generating the second harmonic of the said signal; and
means for combining said signal and said second harmonic to form said deflection signal in the form sin wt − 0.22 sin 2 wt, wherein $w$ is the angular frequency of said fundamental signal.

* * * * *